United States Patent [19]

Yonemoto

[11] Patent Number: 4,749,932
[45] Date of Patent: Jun. 7, 1988

[54] APPARATUS FOR CONTROLLING AN A-C POWERED ELEVATOR

[75] Inventor: Masashi Yonemoto, Inazawa, Japan

[73] Assignee: Mitsubishi Denki Kabushiki Kaisha, Japan

[21] Appl. No.: 877,507

[22] Filed: Jun. 23, 1986

[30] Foreign Application Priority Data

Jun. 27, 1985 [JP] Japan .................. 60-140932
Aug. 15, 1985 [JP] Japan .................. 60-179766

[51] Int. Cl.⁴ .............................. H02P 5/40
[52] U.S. Cl. ......................... 318/759; 318/762
[58] Field of Search .............. 318/757, 758, 759, 762

[56] References Cited

U.S. PATENT DOCUMENTS

| | | | |
|---|---|---|---|
| 3,718,851 | 2/1973 | Graf et al. | 318/806 |
| 4,262,241 | 4/1981 | Azusawa | 318/764 |
| 4,320,332 | 3/1982 | Sugimoto | 318/798 |
| 4,405,886 | 9/1983 | Williamson | 318/757 |
| 4,475,631 | 10/1984 | Nomura | 318/759 |
| 4,599,549 | 7/1986 | Mutoh et al. | 318/798 |

Primary Examiner—David Smith, Jr.
Attorney, Agent, or Firm—Leydig, Voit & Mayer

[57] ABSTRACT

An apparatus for controlling an A-C powered induction motor for an elevator cage, said apparatus comprising a rectifier for converting 3-phase A-C power into D-C electric power, an inverter connected to the rectifier for converting the D-C power into A-C power of variable voltage and variable frequency, a current detector connected to detect input current of the inverter, a power detector for detecting power supplied to the inverter based upon an output of the current detector, a control unit for generating a command signal to control the inverter in accordance with slip of the induction motor as determined by the power supplied to the inverter, and a correcting unit operable responsive to the power detected by the power detector for correcting the slip of the motor to maintain the power supplied to the inverter at predetermined values.

11 Claims, 8 Drawing Sheets

APPARATUS FOR CONTROLLING AN A-C POWERED ELEVATOR

BACKGROUND OF THE INVENTION

1. Field of the Invention:

The present invention relates an apparatus for controlling an elevator that is driven by an induction motor and, more particularly, to a process of regenerative power.

2. DESCRIPTION OF THE PRIOR ART

In an A-C elevator in which a commercial A-C power source is converted by a converter into a D-C power, the D-C power is then converted by an inverter into an A-C power of variable voltage and variable frequency to drive an induction motor for hoisting the cage of the elevator, the regenerative power generated from the elevator is consumed in the motor. An example of such an A-C elevator has hitherto been proposed in Japanese Patent Application Laid-open No. 59-17879.

FIGS. 12 and 13 show the prior-art apparatus for controlling the A-C elevator mentioned above. FIG. 12 is a view of the construction, and FIG. 13 is a simple equivalent circuit of the induction motor.

In FIG. 12, numeral 1 indicates three-phase A-C power sources, numeral 2 designates circuit breakers connected to the A-C power sources 1, numeral 3 denotes a converter, which comprises three-phase full-wave rectifiers having diodes connected to the circuit breakers 2, numeral 4 indicates a smoothing capacitor connected to the D-C side of the converter 3, numeral 5 designates an inverter connected to the smoothing capacitor 4 and having a transistor and a diode for converting the D-C power into three-phase A-C powers of variable voltage and variable frequency, numeral 6 denotes a three-phase induction motor connected to the A-C side of the inverter 5, numeral 7 indicates a drive sheave of a hoist driven by the motor 6, numeral 8 designates a main cable engaged with the sheave 7 and coupled at respective ends thereof with a cage 9 and a balance weight 10, numeral 11 denotes a pulse generator coupled directly with the motor 6 for detecting the rotating speed of the motor 6, numeral 12 indicates an inverter drive unit controlled by control means 13 for driving the inverter 5.

The prior-art apparatus for controlling the A-C elevator is constructed as described above, and when the circuit breaker 2 is closed, the A-C power source 1 is connected to the converter 3, which rectifies the three-phase power into D-C power, and the D-C power is smoothed by the smoothing capacitor 4. When a start command is applied to the cage 9, the inverter drive unit 12 operates, the inverter 5 converts the D-C power into three-phase A-C power of variable voltage and variable frequency, and supplies the A-C power to the motor 6. Thus, the motor 6 rotates to elevate the cage 9. On the other hand, the rotating speed of the motor 6 is detected by the pulse generator 11, a speed signal at the output of the generator 11 is fed back to control the inverter drive unit 12, thereby accurately controlling the cage 9 to run at the desired speed.

The detailed control of the prior-art apparatus is omitted, but, in summary, when the elevator is operated in the power mode, the torque of the motor 6 is controlled by so-called "slip frequency control", but when the elevator is regeneratively operated, the regenerative power is consumed in the motor 6 as will be described herebelow.

The power $P_1$ consumed in the motor 6 will be obtained from an equivalent circuit shown in FIG. 13.

$$P_1 = V^2 g_0 + r_1 \left(\frac{V}{Z}\right)^2 + r_2 \left(\frac{V}{Z}\right)^2 \quad (1)$$

$$Z = \sqrt{(x_1 + x_2)^2 + (r_1 + r_2/s)^2} \quad (2)$$

wherein:
 V denotes an A-C input power voltage,
 Z denotes total impedance of the motor,
 $g_0$ denotes exciting conductance of the motor,
 $b_0$ denotes exciting susceptance of the motor,
 $r_1$ denotes primary resistance of the motor,
 $r_2$ denotes the secondary resistance of the motor (primary conversion value),
 $x_1$ denotes the primary leakage reactance of the motor,
 $x_2$ denotes the secondary leakage reactance of the motor (primary conversion value),
 S denotes the slip of the motor.

On the other hand, the power Pg generated as the regenerative power is given by, $$P_g = \left(\frac{V}{Z}\right)^2 \cdot \left(\frac{1-S}{S}\right) r_2 \quad (3)$$

wherein: is the slip S is controlled to become:

$$P_1 + P_g = 0 \quad (4)$$

the regenerative power is completely consumed in the motor.

The equations (1) and (3) are substituted in the equation (4) to obtain the slip S.

$$S = -\frac{r_2}{r_1 + g_0 Z^2} \quad (5)$$

Normally, since the exciting conductance $g_0$ is sufficiently small, assuming that the exciting conductance $g_0$ is ignored, the equation (5) can be simplified as below.

$$S = -\frac{r_2}{r_1} \quad (6)$$

Therefore, when the slip is controlled according to the equation (6), the regenerative power can be completely consumed in the motor. In this case, the regenerative power $P_{g1}$ is given as below by substituting the equation (6) in the equation (3), $$P_{g1} = -\left(\frac{V}{Z}\right)^2 (r_1 + r_2) \quad (7)$$

The physical meaning of the equation (7) exhibits that the regenerative power is all consumed in the primary resistance $r_1$ and the secondary resistance $r_2$.

Assume that the slip S is given by, $$S = -\frac{r_2}{R_1 r_1} > -\frac{r_2}{r_1}$$

and if ($R_1 > 1$) is obtained, the regenerative power $P_{g2}$ in this case is give by, $$P_{g2} = -\left(\frac{V}{Z}\right)^2 (R_1 r_1 + r_2) \quad (8)$$

and, since $R_1 > 1$ exists, the regenerative power more than consumed in the motor 6 is returned.

On the contrary, if the slip S is given by, $$S = -\frac{R_2 r_2}{r_1} < -\frac{r_2}{r_1} \ (R_2 > 1)$$

the regenerative power $P_{g3}$ in this case is given by, $$P_{g3} = -\left(\frac{V}{Z}\right)^2 \left(\frac{r_1}{R_2} + r_2\right) \quad (9)$$

and, since $R_2 > 1$ exists, the power larger than the regenerative power is consumed in the motor 6.

More specifically, the power is further supplied from the power source 1.

In summary, if the slip S is given by, $$S > -\frac{r_2}{r_1}$$

a problem arises in that the regenerative power is returned to the power source side. If the slip S is given by, $$S < -\frac{r_2}{r_1}$$

since the power is further supplied from the power source, the heat generated from the motor 6 increases. Then, $$S = -\frac{r_2}{r_1}$$

is the condition for balancing between the regenerative power and the consumed power in the motor 6.

In the abovementioned prior-art apparatus for controlling the A-C elevator, it is not easy to operate the elevator with the slip S to be fixed to the equation given by, $$S = -\frac{r_2}{r_1}$$

This is because it is difficult to accurately measure the resistance of the primary resistance $r_1$ and the secondary resistance $r_2$. Further, the resistance values largely alter according to the temperature. Thus, the slip S can hardly be controlled according to the condition given by, $$S = -\frac{r_2}{r_1}$$

and, if the condition is displaced, the regenerative power is returned to the power source side, or the heat generated in the motor 6 increases as drawbacks.

SUMMARY OF THE INVENTION

The present invention has the objective to overcome the above drawbacks and problems and has for main object to provide an apparatus for controlling an A-C elevator, which can always set the slip S of a motor to the vicinity given by, $$S = -\frac{r_2}{r_1}$$

eliminate a device for processing regenerative power and prevent unnecessary power from being supplied to the motor at the regenerative operation time.

The apparatus for controlling an A-C elevator according to an embodiment of the present invention comprises a current detector for detecting an input current of an inverter, a power detector for detecting power supplied to an inverter by the output of the current detector, and correcting means for correcting the slip of the motor from the supplied power.

In this embodiment, the slip S of the motor is always corrected to be set to the vicinity given by, $$S = -\frac{r_2}{r_1}$$

by the power supplied to the inverter so that the power becomes a predetermined value.

In another embodiment according to the present invention, an apparatus for controlling an A-C elevator comprises current command generating means for generating a current command signal to an inverter, a voltage command generator for generating a voltage command signal of an inverter from a deviation signal between the current command signal and a motor current, a phase detector for detecting the phase of the voltage command signal, and slip correcting means for correcting the slip of the motor by the output of the phase detector.

In still another embodiment of the invention, the slip S of the motor is automatically corrected so that the phase of the output of the phase detector becomes a predetermined value, and the slip S is set to the vicinity given by, $$S = -\frac{r_2}{r_1}$$

BRIEF DESCRIPTION OF THE DRAWINGS

In the drawings, the same symbols indicate identical or corresponding portions.

DESCRIPTION OF THE PREFERRED EMBODIMENTS

Figure 1:
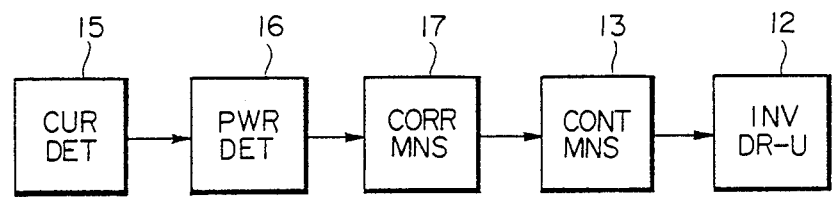
FIG. 1 is a block diagram showing the entire construction of an embodiment of an apparatus for controlling an A-C elevator according to the present invention.

FIGS. 1 to 5 show an embodiment of the present invention, wherein FIG. 1 shows the entire construction of the apparatus for controlling an A-C elevator of the invention.

As apparent from FIG. 1, the embodiment comprises a current detector 15 for detecting the input current of an inverter 5, a power detector 16 for detecting power supplied to the inverter 5 as a function of the output of the current detector 15, correcting means 17 for correcting the slip of the motor 6 as a function of the output of the power detector 16, and control means 13 for controlling the inverter drive unit 12 in response to the output of the correcting means 17.

Figure 2:
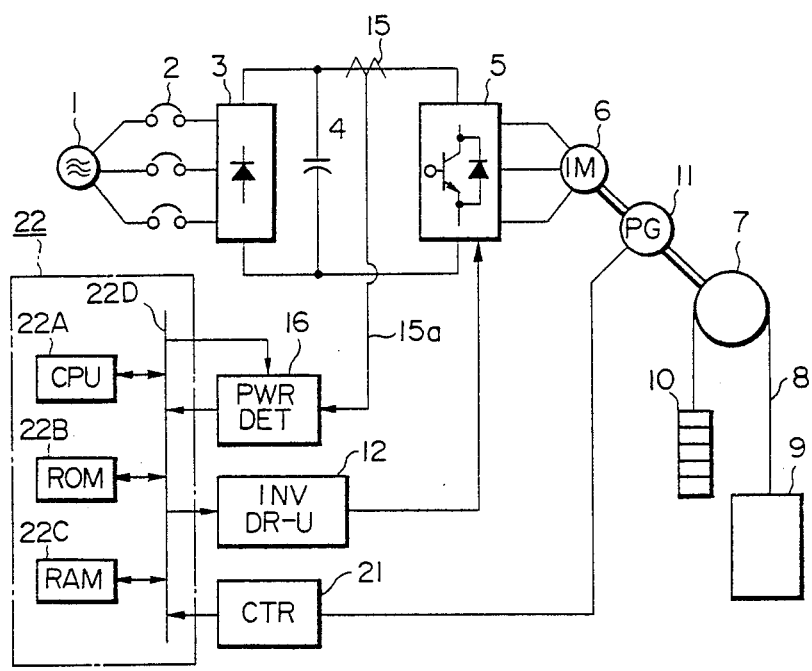
FIG. 2 is a circuit diagram showing the embodiment.

FIG. 2 is a circuit diagram used in the embodiment of FIG. 1.

In FIG. 2, numeral 15a designates the output of the current detector 15 as a current signal, numeral 21 indicates a counter for counting pulses generated by the pulse generator 11, numeral 22 denotes a microcomputer which represents the correcting means 17 and the control means 13 in FIG. 1, and comprises a CPU 22A, a ROM 22B, a RAM 22C and buses 22D for connecting them.

Figure 3:
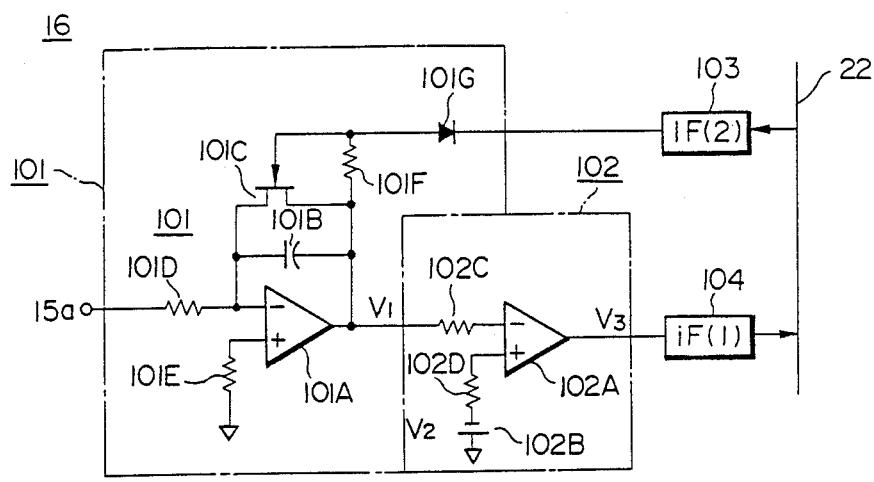
FIG. 3 is a circuit diagram of the power detector in FIG. 2.
Figure 4:
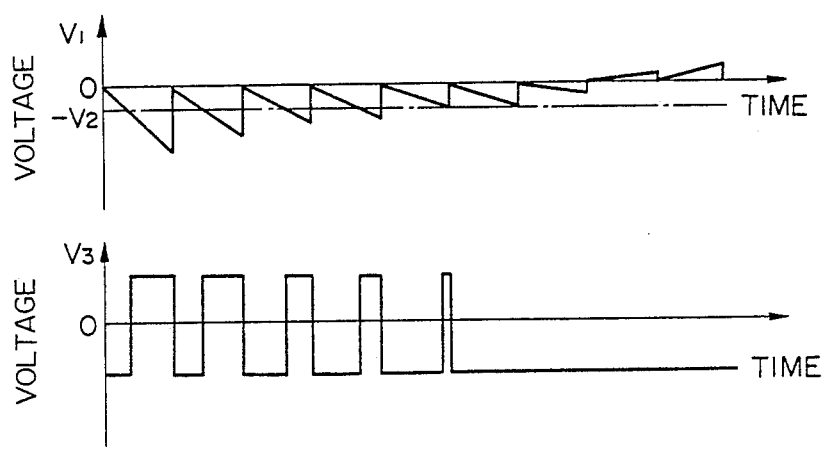
FIG. 4 is characteristic diagrams for explaining the operation of FIG. 3.

FIG. 3 is a circuit diagram of the power detector 16, and FIG. 4 shows the details of the operation.

In FIG. 3, numeral 101 designates a resettable integrator, which has an operational amplifier 101A, a capacitor 101B, a field effect transistor (hereinbelow referred to as "FET") 101C, resistors 101D to 101F, and a diode 101G. Numeral 102 indicates a comparator, which has an operational amplifier 102A, a reference voltage 102B, and resistors 102C and 102D. Numeral 103 denotes an interface, which conducts the FET 101C to discharge the capacitor 101B when the CPU 22A outputs a reset command to the integrator 101. Numeral 104 designates an interface for inputting the operation of the comparator 102 to the CPU 22A. Symbol $V_1$ designates the output voltage of the integrator 101, symbol $V_2$ indicates a reference voltage, and symbol $V_3$ denotes the output voltage of the comparator 102.

Figure 5:
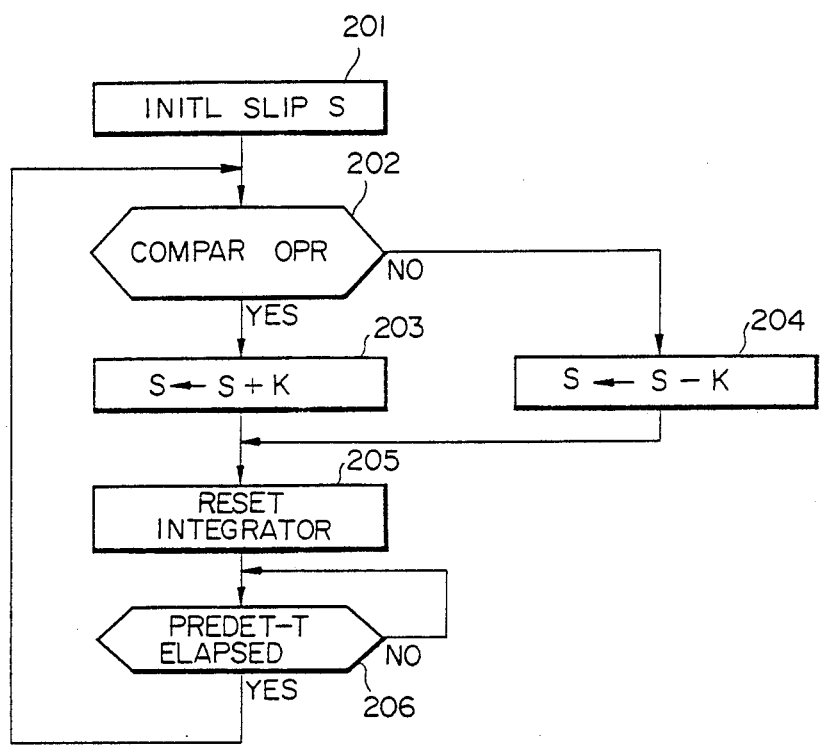
FIG. 5 is a flow chart showing the operation of the correcting means in FIG. 1.

Next, the operation of this embodiment will be described by referring to FIGS. 4 and 5. FIG. 5 is a flow chart showing the program stored in the ROM 22B of the microcomputer 22.

Figure 12:
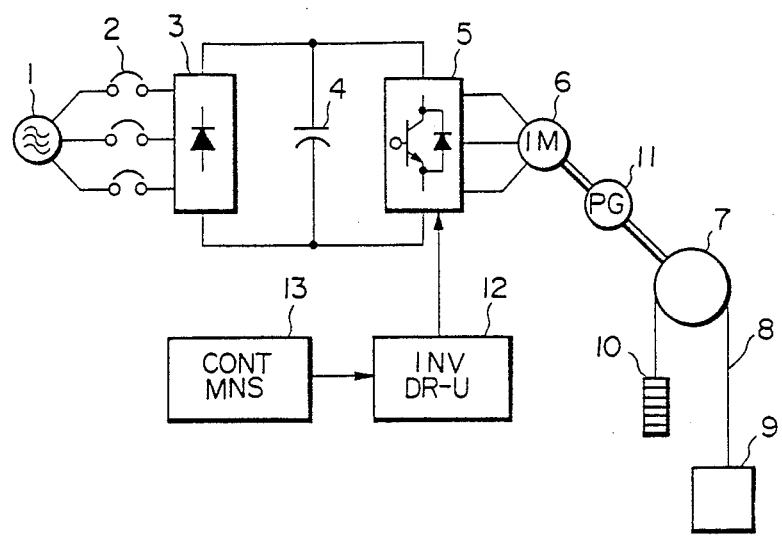
FIG. 12 is a view showing a prior-art apparatus for controlling an A-C elevator.
Figure 13:
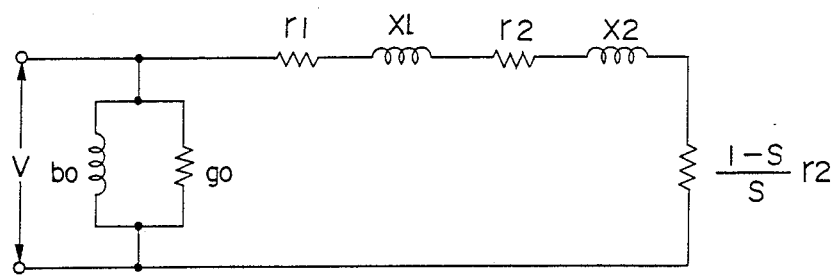
FIG. 13 is an equivalent circuit of the induction motor.

The operation of the cage 9 after the circuit breaker 2 is closed is similar to that described with reference to FIG. 12.

Next the flow of power will be discussed. When a load is carried in the cage 9 and the cage 9 is elevated upward, it is in a power drive mode of operation. The power is supplied from the A-C power source 1 through the converter 3 and the inverter 5 to the motor 6. In this case, the inverter 5 is controlled by the "slip frequency control" known per se. However, when the load is carried in the cage 9 and the cage 9 is elevated downward, it becomes a regenerative operation. If the slip S is controlled in accordance with the equation (6), the regenerative power is all consumed in the motor 6 as described above. In this case, only the reactive power is supplied from the inverter 5 to the motor 6, and effective power is not communicated. However, as described above, it is impossible to control the slip S accurately in accordance with the equation (6), and the effective power is in fact communicated therebetween.

Therefore, the effective power is detected in the following sequence at the regenerative operation time to correct the slip S. The input current of the inverter 5 is first measured by the current detector 15, and integrated by the integrator 101 in the power detector 16. Assume that the current direction at the power drive time is positive, the average value of the input current of the inverter has a positive value. Thus, the output voltage $V_1$ of the integrator 101 becomes a negative integrated value, and its gradient becomes abrupt proportional to the current. Assume also that the integrated value is reset at every predetermined time. This state is shown in FIG. 4. Then, the comparator 102 compares the voltage $V_1$ with the reference voltage $V_2$, and operates in case of $V_1 < -V_2$ to set the output voltage $V_3$ to "H".

The direction of the current becomes reverse at the regenerative operation time, and the voltage $V_1$ becomes a positive integrated value. If only the reactive power is supplied, the average value of the input current of the inverter becomes zero, and the voltage $V_1$ accordingly becomes zero.

Now, the correcting means 17 in the microcomputer 22 corrects the slip as shown in FIG. 5. The apparatus shown in FIG. 1 which does not comprise regenerative power processor, sets the initial value of the slip S given by $$S << -\frac{r_2}{r_1}$$

so that the regenerative power may not absolutely be returned to the power source side, and corrects the slip S always to operate at slightly power drive side.

First, in step 201, the initial value of the slip S is set as given by, $$S << -\frac{r_2}{r_1}$$

In step 202, the voltage $V_3$ is input through the interface 104, and the operating state of the comparator 102 is examined. If the comparator 102 is operated, a predetermined value K is added to the slip S in step 203 to correct the slip. If not operated, the value K is subtracted from the slip S in step 204. Then, the integrator 101 is reset through the interface 103 in step 205. In step 206, the lapse time is counted, and when a predetermined time is elapsed, it is again returned to the step 202, and the correction of the slip is repeated as described above. Thus, the slip S is always corrected to the optimum value.

Figure 6:
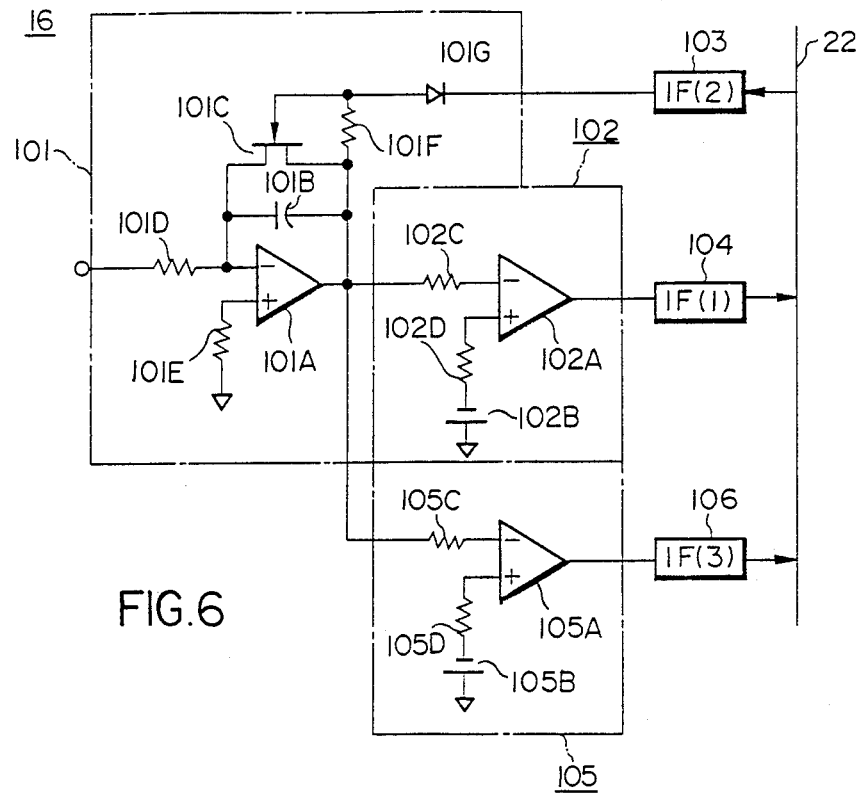
FIG. 6 is a circuit diagram of a power detector in another embodiment of the present invention.

FIG. 6 shows another embodiment of the present invention.

In FIG. 6, numeral 105 designates a comparator, which has an operational amplifier 105A, a reference voltage 105B, and resistors 105C and 105D. The reference voltage 105B has a voltage different from the reference voltage 102B. Numeral 106 indicates an interface for inputting the operation of the comparator 105 to the CPU 22A. In this structure, the slip is corrected, for example, by adding S and K when the comparator 102 is operated and subtracting K by S when the comparator 102 is not operated. With this arrangement, the number of correcting the slip decreases to expect stable torque control.

The reference voltages of the comparators 102 and 105 may not be limited to the abovementioned values, but may be set to arbitrary value in response to the apparatus of the invention so as to similarly correct the slip.

According to one embodiment of the present invention as described above, the power supplied from the input current of the inverter to the inverter is detected to correct the slip of the induction motor. Therefore, the slip at the regenerative operation time can be set to the optimum value, it can prevent unnecessary power from supplying to the motor at the regenerative time, and can also eliminate a unit for processing the regenerative power, thereby simplifying the apparatus of the invention.

FIGS. 7 to 11 show another embodiment of the present invention, wherein numerals 1 to 11 designate the same parts as those in the prior-art apparatus.

Figure 7:
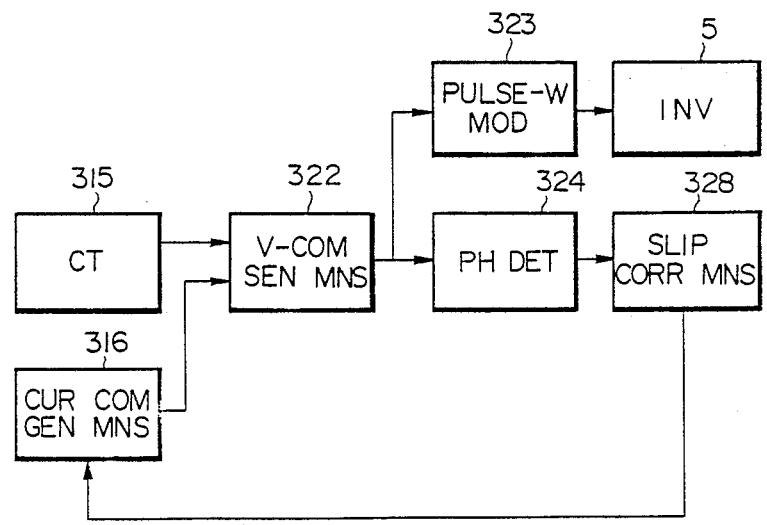
FIG. 7 is a block diagram showing another embodiment of the present invention.

FIG. 7 shows the block diagram of the entire apparatus.

As apparent from FIG. 7, another embodiment comprises a current transformer 315 for detecting the current of the motor 6, a voltage command signal is generated by a voltage command generator 322 in response to the output of the transformer 315 and the output of current command generating means 316 to operate a pulse width modulator 323, thereby controlling the inverter 5. On the other hand, a phase detector 324 detects the phase of the voltage command signal, slip correcting means 328 corrects the slip of the motor 6 by the output of the detector, and the current command signal is controlled by the output of the correcting means 328.

Figure 8:
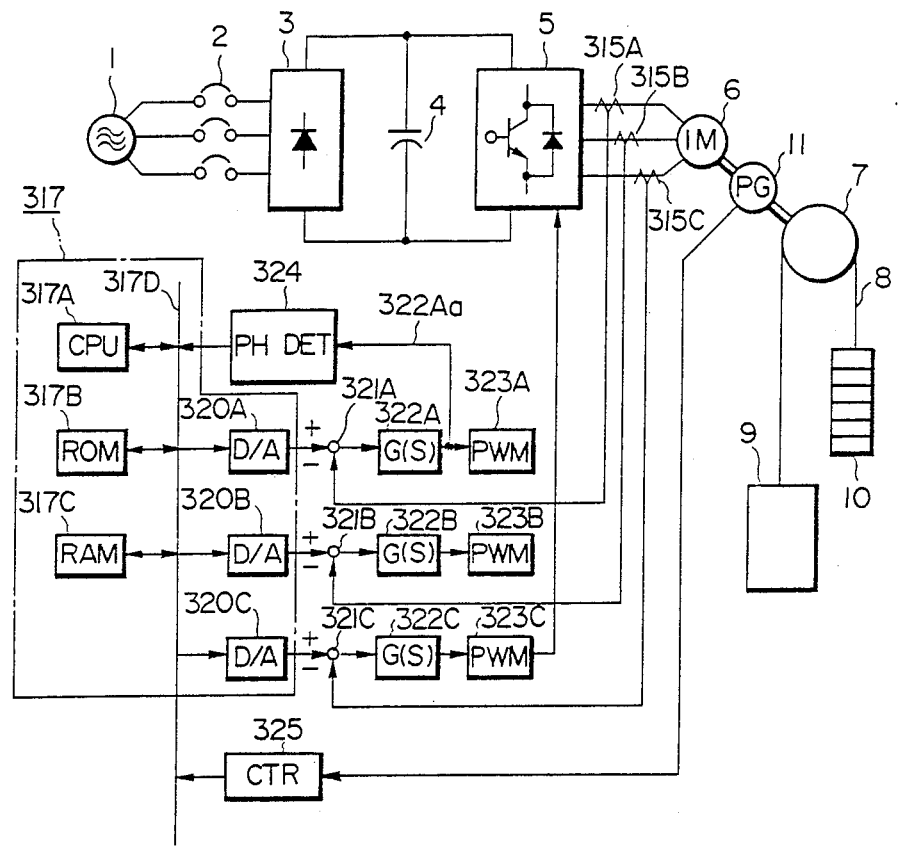
FIG. 8 is a circuit diagram showing another embodiment of the invention.

FIG. 8 is a circuit diagram used in this embodiment of FIG. 7.

In FIG. 8, numerals 315A to 315C designate current transformers for detecting the currents of the phases U to W of the motor 6, numerals 317A to 317D, 320A to 320C indicate a microcomputer 317 for forming the current command generating means 316 and the slip correcting means 328 of FIG. 7. Numeral 317A denotes a central processing unit (CPU), numeral 317B designates a ROM, numeral 317C indicates a RAM, numeral 317D designates a bus for address and data, numerals 320A to 320C are D/A converters for converting the current command signals of the phase U to W supplied as digital quantities, numerals 321A to 321C indicate adders for generating the deviation signals between the outputs of the converters 320A to 320C and the outputs of the transformers 315A to 315C, numerals 322A to 322C denote voltage command generators for generating the voltage command signal of the inverter 5 having amplifiers including transfer function G(S), wherein 322Aa is a voltage command signal of the phase U, numerals 323A to 323C designate pulse width modulators for pulse-width modulation control the transistor of the inverter 5, numeral 324 indicates a phase detector for detecting the phase of the voltage command signal 322Aa, and numeral 325 denotes a counter for counting the pulses from the generator 11.

Figure 9:
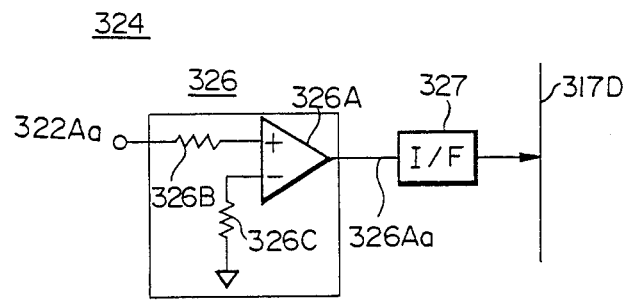
FIG. 9 is a circuit diagram showing the phase detector of FIG. 8.

FIG. 9 shows a circuit diagram of the phase detector 324.

In FIG. 9, numeral 326 designates a comparator having an operational amplifier 326A and resistors 326B and 326C, numeral 326Aa indicates the output signal of the comparator 326A, and numeral 327 indicates a converter for inputting the comparison signal 326Aa to the CPU 316.

Figure 10:
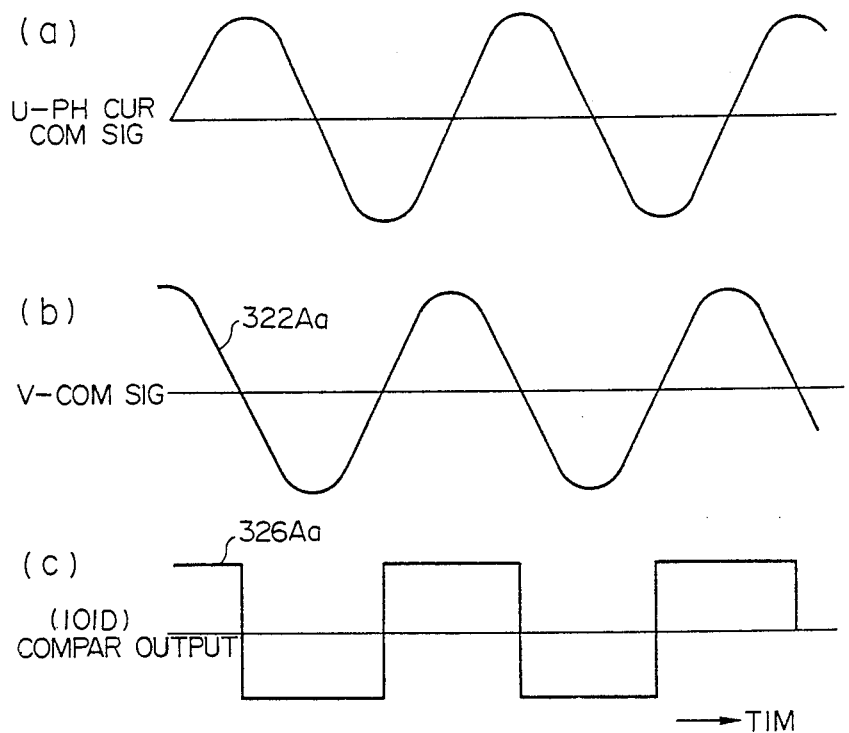
FIG. 10 is characteristic diagrams for explaining the sections of FIG. 8.

The operation of this embodiment will be described with reference to FIG. 10. FIG. 10 shows a characteristic diagram of the signal waveforms of the respective sections.

When the circuit breaker 2 is closed, the three-phase A-C power is rectified into D-C power as described above, and smoothed by the smoothing capacitor 4.

Now, when a start command is applied to the cage 9, the CPU 316 supplies the current command signals for the phases U to W to the converters 320A to 320C. The current command signals are digital, and converted by D/A converters 320A to 320C to analog amounts, and supplied to the adders 321A to 321C. Then, the current command signals are amplified by the voltage command generators 322A to 322C, pulse-width-modulated by the pulse width modulators 323A to 323C, then generated as the voltage command signals (omitted for the frequency command signals) to control the transistors of the inverter 5. Thus, the inverter 5 is operated to convert the input D-C power to the A-C power of variable voltage and variable frequency, supplied to the motor 6, thereby elevating the cage 9. On the other hand, the currents of the phases U to W of the motor 6 are respectively detected by the current transformers 315A to 315C, and supplied as the current feedback signals to the adders 321A to 321C. Further, the rotating speed of the motor 6 is detected by the pulse detector 11, the number of pulses is counted by the counter 325, and fed back as the speed signal to the CPU 317A. Thus, the elevating speed of the cage 9 is accurately controlled and provides a good riding feeling.

Next, the flow of the power will be considered. Since the cage 9 carries the load (the maximum load capable of carrying in fact) and elevates upwardly, it is in power drive mode, and it is supplied with the power from the A-C power source 1. The power is supplied through the converter 3 and the inverter 5 to the motor 6. In this case, the inverter 5 is "slip frequency controlled" known per se. However, when the cage 9 carries the load and elevates downwardly, it is in a regenerative mode of operation. If the slip S is controlled in accordance with the equation (6), the regenerative power is all consumed in the motor 6 as described above. In this case, only the reactive power is supplied from the inverter 5 to the motor 6, and the effective power is not communicated therebetween. However, as described above, it is difficult to accurately control the slip S in accordance with the equation (6), and the effective power is actually communicated.

Therefore, the inverter voltage is detected by the means at the regenerative operating time as will be described, thereby correcting the slip S.

First, the adder 321A compares the U-phase current command signal with the output of the current transformer 315A, i.e., the U-phase motor current to calculate the current deviation. This deviation signal is amplified by the voltage command generator 322A to become a voltage command signal 322Aa. The signal 322Aa is input to the comparator 326 of the phase detector 324, the output of which (326Aa) becomes a rectangular wave "H" in case of positive half cycle and "L" in case of negative half cycle.

The relationship of the various values in the case that the slip S is given accurately by the equation (6) at the regenerative operation time becomes as shown in FIG. 10. When the slip S is given by the equation (6), the inverter 5 may supply only the reactive power. Thus, the U-phase voltage command signal 322Aa is advanced in phase by 90 degrees ($\pi/2$ radian) from the U-phase current command signal. If the slip S does not satisfy the equation (6), the effective power is communicated between the inverter 5 and the motor 6. Thus the phase difference between the U-phase voltage command signal 322Aa and the U-phase current command signal is displaced from 90 degrees ($\pi/20$ radian).

Figure 11:
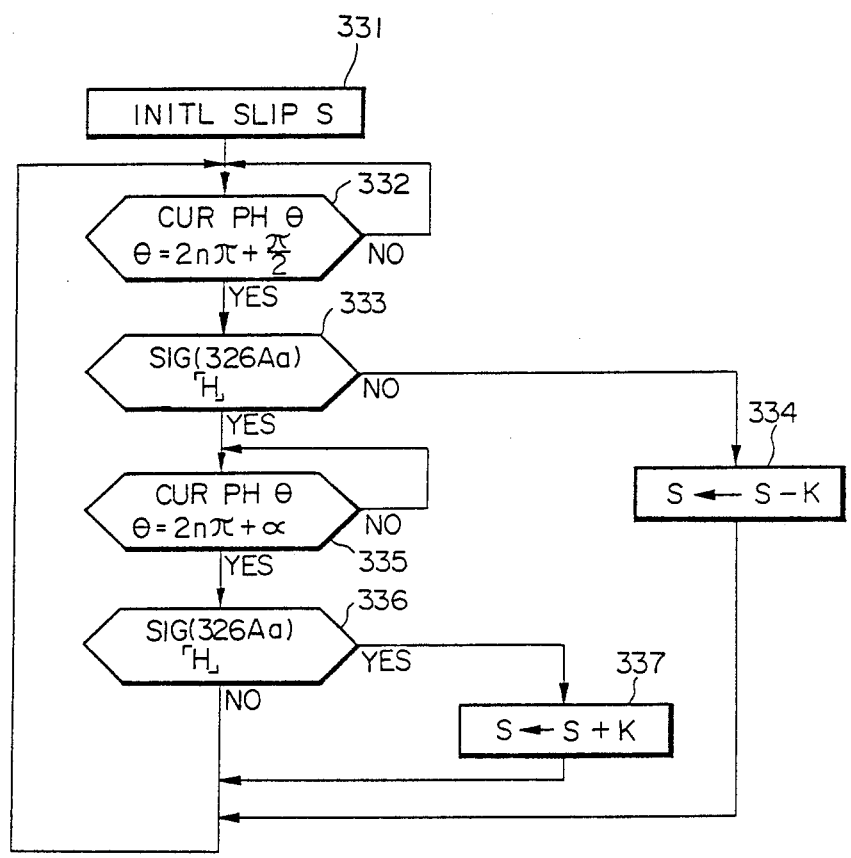
FIG. 11 is a flow chart showing the operation of FIG. 8.

Then, the slip correcting operation at the regenerative operation time will be described with reference to FIG. 11. FIG. 11 is a flow chart showing the program stored in the ROM 317B.

In the apparatus shown in FIG. 8, a regenerative power processor is not provided. Therefore, the initial value of the slip S is set to;

$$S << -\frac{r_2}{r_1}$$

so that the regenerative power is not absolutely returned to the power source side in step 331, and a slight effective power is always supplied to the motor 6 by correcting the slip S.

In step 322, the phase $\theta$ of the U-phase current command signal is determined whether or not the phase $\theta$ has become $2n\pi + \pi/2$ radian (n is integer number). When it becomes, $$\theta = 2n\pi + \frac{\pi}{2}$$

it is advanced to step 333, and the signal 326Aa is input through the converter 327. If the signal 326A is "L", it is advanced to step 334, and a predetermined value K is subtracted from the slip S to correct the slip, and returned to step 332. If the signal 326Aa is "H", it is advanced to step 335, where it is instructed to wait for the phase $\theta$ of the U-phase current command signal to become $2n\pi + \alpha$ radian. The value $\alpha$ is set to a predetermined phase to satisfy the relationship given by, $$\frac{\pi}{2} < \alpha < \pi$$

When $\theta = 2n\pi + \alpha$, it is advanced to step 336, and the signal 326Aa is again input through the converter 327, and if "H", the value K is added to the slip S in step 337 to correct the slip, and then returned to step 332.

Thus, the slip S is always corrected to the optimum value.

In the embodiment described above, the slip S is corrected from the phase of the U-phase current command signal and the U-phase voltage command signal 322Aa. However, the invention is not limited to the U-phase, and the slip S may be corrected by the corresponding signals of V or W phase to obtain a similar effect.

According to the other embodiments of the invention as described above, the phase of the inverter voltage is detected, compared with the phase of the current command signal, and the slip of the motor is corrected so that the phase difference of both becomes the predetermined value. Therefore, the slip at the regenerative operation time can be set to the optimum value whereby it can prevent unnecessary power from being supplied to the motor at the regenerative time, eliminate a unit for processing the regenerative power, thereby simplifying the apparatus of the invention.

What is claimed is:

1. An apparatus for controlling an A-C powered induction motor for an elevator cage, said apparatus comprising:
   a rectifier for converting 3-phase A-C power into D-C electric power,
   an inverter connected to said rectifier for converting the D-C power into A-C power of variable voltage and variable frequency,
   a current detector connected to detect input current of said inverter,
   a power means for detecting power supplied to said inverter based upon an output of said current detector,
   control means for generating a command signal to control said inverter in accordance with slip of the induction motor as determined by the power supplied to the inverter, and
   correcting means operable responsive to the power detected by said power detector means for operating said inverter to correct the slip of said motor to maintain the power supplied to the inverter at predetermined values.

2. An apparatus for controlling an A-C powered elevator according to claim 1 wherein said correcting means corrects the slip when said induction motor is operated in a regenerative mode.

3. An apparatus for controlling an A-C powered elevator according to claim 2 wherein said power detector comprises an integrator for integrating the input current detected by said current detector and for generating an integral output representative thereof, and a comparator for comparing the integral output of said integrator with a predetermined value and for generating an output to said correcting means.

4. An apparatus for controlling an A-C powered elevator according to claim 3 wherein said correcting means corrects the slip of the induction motor by adding a predetermined correcting value to the command signal when the integral output of said integrator is larger than the predetermined value, and by subtracting the predetermined correcting value from the command signal when the integral output of said integrator is smaller than the predetermined value.

5. An apparatus for controlling an A-C powered elevator according to claim 4 wherein said correcting means corrects the slip of the induction motor at every predetermined period.

6. An apparatus for controlling an A-C powered elevator according to claim 4 wherein said integrator is reset after every correction of the slip performed by said performed by said correcting means.

7. An apparatus for controlling an A-C powered elevator according to claim 2 wherein:

said power detector comprises an integrator for integrating the input current detected by said current detector and generating an integral output representative thereof, a first comparator for comparing the integral output of said integrator with a first predetermined value, and a second comparator for comparing the integral output of said integrator with a second predetermined value, and said correcting means corrects the slip of the induction motor by adding a predetermined correcting value to the command signal in response to an output of said comparator, and by subtracting the predetermined correcting value from the command signal in response to an output of said second comparator.

8. An apparatus for controlling an A-C powered elevator according to claim 2 wherein said correction means sets an initial value of the slip of the induction motor smaller than $-r_2/r_1$ where $r_1$ represents a primary resistance of the induction motor and $r_2$ a secondary resistance of the induction motor.

9. An apparatus for controlling an A-C powered induction motor for an elevator cage, said apparatus comprising:

a rectifier for converting 3-phase A-C powered into D-C electric power, an inverter connected to said rectifier for converting the D-C power into A-C power of variable voltage and variable frequency, a current transformer for detecting current of said motor and for generating a motor current signal, current command generating means for generating a current command signal for the inverter, a voltage command generator for generating a voltage command signal for the inverter from a deviation between the current command signal and the motor current signal, a phase detector means for detecting phase of the voltage command signal so as to determine slip of the induction motor represented by power supplied to said inverter, and slip correcting means for correcting the slip of the induction motor to maintain the power supplied to the inverter at predetermined values and for supplying the corrected slip from the output of said phase detector means to said current command generator means.

10. An apparatus for controlling an A-C powered elevator according to claim 9 wherein when the phase of the current command signal becomes $2n+/2$ (n:integer number) and the voltage command signal is in a negative half cycle, said slip correcting means corrects the slip of the induction motor by subtracting a predetermined correcting value from a reference slip value.

11. An apparatus for controlling an A-C powered elevator according to claim 10 wherein when the voltage command signal is in a positive half cycle and the phase of the current command signal is advanced by a predetermined phase, the slip correcting means corrects the slip of the induction motor by adding a predetermined value to the reference slip value.

* * * * *